United States Patent
Mannsperger et al.

(10) Patent No.: US 12,018,747 B2
(45) Date of Patent: Jun. 25, 2024

(54) METHOD FOR CONTROLLING A HYDRAULIC UNIT IN PARTICULAR FOR A DRIVETRAIN OF A MOTOR VEHICLE, HYDRAULIC UNIT AND DRIVETRAIN WITH HYDRAULIC UNIT

(71) Applicant: Schaeffler Technologies AG & Co. KG, Herzogenaurach (DE)

(72) Inventors: Ralf Mannsperger, Renchen (DE); Timo Enders, Bensheim (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 0 days.

(21) Appl. No.: 17/768,012

(22) PCT Filed: Sep. 16, 2020

(86) PCT No.: PCT/DE2020/100804
§ 371 (c)(1),
(2) Date: Apr. 11, 2022

(87) PCT Pub. No.: WO2021/073681
PCT Pub. Date: Apr. 22, 2021

(65) Prior Publication Data
US 2024/0093779 A1    Mar. 21, 2024

(30) Foreign Application Priority Data
Oct. 15, 2019    (DE) .................... 10 2019 127 714.0

(51) Int. Cl.
*F16H 61/00* (2006.01)
*F16D 48/02* (2006.01)

(52) U.S. Cl.
CPC ..... *F16H 61/0025* (2013.01); *F16D 48/0206* (2013.01); *F16D 2048/0212* (2013.01); *F16D 2048/0221* (2013.01); *F16D 2500/5014* (2013.01)

(58) Field of Classification Search
CPC ......... F16D 48/0206; F16D 2048/0212; F16D 2048/0221; F16D 2500/5014; F16H 61/0025
See application file for complete search history.

(56) References Cited

U.S. PATENT DOCUMENTS

| | | | |
|---|---|---|---|
| 6,733,299 B2 | 5/2004 | Eguchi et al. | |
| 2019/0055937 A1 | 2/2019 | Parmeshwar | |

FOREIGN PATENT DOCUMENTS

| | | |
|---|---|---|
| CN | 102996789 A | 3/2013 |
| CN | 106104056 A | 11/2016 |
| DE | 102009008521 A1 | 9/2009 |
| DE | 102012021211 A1 | 4/2014 |
| DE | 102015214998 A1 | 2/2017 |

(Continued)

*Primary Examiner* — Michael Leslie

(57) ABSTRACT

A method for controlling a hydraulic unit with a rotational-speed-controlled pump, which, at an outlet side, provides at least two fluid flows in a manner switched by means of switching valves, for actuating at least one slave cylinder and for providing a volume flow which is controlled based on a rotational speed of the pump. To set the volume flow, an efficiency of the pump is calculated based on a comparison of a known slave cylinder volume of the at least one slave cylinder and a quantity of fluid of the pump for the filling of the at least one slave cylinder.

16 Claims, 4 Drawing Sheets

(56) References Cited

FOREIGN PATENT DOCUMENTS

| | | | |
|---|---|---|---|
| DE | 102016215739 A1 | 3/2018 | |
| DE | 102018108776 A1 | 10/2018 | |
| DE | 102017115484 B3 | 11/2018 | |
| DE | 102018131108 A1 * | 6/2020 | ............ F16D 48/02 |
| DE | 102018131758 A1 * | 6/2020 | ............ F16D 48/02 |
| DE | 102019101957 A1 * | 7/2020 | ............ F16D 48/06 |
| DE | 102019102249 A1 | 7/2020 | |
| DE | 102019122170 A1 * | 2/2021 | ......... F16D 48/0206 |
| DE | 102020124112 B3 * | 2/2022 | ......... F16D 48/0206 |
| EP | 1069312 A1 | 1/2001 | |
| EP | 1284369 A1 | 2/2003 | |
| EP | 2664826 A1 | 11/2013 | |
| EP | 2696111 A1 | 2/2014 | |
| WO | 2009146816 A1 | 12/2009 | |
| WO | 2017206980 A1 | 12/2017 | |
| WO | 2018001408 A1 | 1/2018 | |
| WO | 2020177803 A1 | 9/2020 | |

\* cited by examiner

METHOD FOR CONTROLLING A HYDRAULIC UNIT IN PARTICULAR FOR A DRIVETRAIN OF A MOTOR VEHICLE, HYDRAULIC UNIT AND DRIVETRAIN WITH HYDRAULIC UNIT

CROSS-REFERENCE TO RELATED APPLICATIONS

This application is the U.S. National Phase of PCT Appln. No. PCT/DE2020/100804 filed Sep. 16, 2020, which claims priority to DE 102019127714.0 filed Oct. 15, 2019, the entire disclosures of which are incorporated by reference herein.

TECHNICAL FIELD

The disclosure relates to a method for controlling a hydraulic unit, a hydraulic unit and a drivetrain with a hydraulic unit comprising a rotational-speed-controlled pump, which, at an outlet side, provides at least two fluid flows in a manner switched by means of switching valves, for actuating at least one slave cylinder and for providing a volume flow which is controlled based on a rotational speed of the pump.

BACKGROUND

Unpublished patent application No. DE 10 2019 102 249.5 (published as DE 102019102249A1) describes a method for determining a leakage, a hydraulic unit for carrying out this method and a drivetrain comprising this hydraulic unit.

SUMMARY

A method of controlling a volume flow of the hydraulic unit in an improved manner is provided.

The proposed method is used for controlling a hydraulic unit, in particular for a drivetrain of a motor vehicle, with a rotational-speed-controlled pump that is subject to leakage. The pump can be designed, for example, as a non-pressure-compensated gear pump, in which the fluid is discharged as a pressure medium reducing the pressure via a leakage line into a fluid sump when the pressure is not reduced via the outlet. The pump provides at least two fluid flows on the outlet side. For example, a fluid flow can be provided dependent on a direction of rotation of the pump. The pump can be driven by an electric motor. The switching and provision of the fluid flows are achieved by means of switching valves, which are switched by a control device that can also control the pump.

At least one fluid flow is used to actuate and pressurize at least one slave cylinder, substantially without fluid loss. At least two slave cylinders with two fluid flows switched by switching valves can be provided in a drivetrain, in particular an entirely electrically operated drivetrain, wherein one slave cylinder actuates a separating clutch provided between a drive unit and a transmission and the other slave cylinder actuates a parking lock along a respectively specified actuation path.

At least one further fluid flow is configured as a volume flow, which is set based on a rotational speed of the pump and is used, for example, for cooling and/or lubricating components of the drivetrain, for example the separating clutch. Due to the system-related leakage of the pump, the leakage is determined by means of the proposed method. For this purpose, an efficiency of the pump is calculated based on a comparison of a known slave cylinder volume of the at least one slave cylinder and a determined quantity of fluid of the pump for filling the at least one slave cylinder.

For example, the quantity of fluid is determined by integrating the fluid flow over a filling time of the slave cylinder volume. During filling of the at least one slave cylinder, all other fluid flows of the pump can be switched off or at least held constant.

In order to hold the fluid flow constant over the filling time and thus to simplify an integration or summing of the fluid flow quantity delivered per unit time, the pump can be operated at constant rotational speed during the filling time. For example, the rotational-speed-dependent fluid flow for the at least one slave cylinder is summed along the actuation path for the at least one slave cylinder over the filling time between two piston positions, for example between a position with an unactuated parking lock and a position with an actuated parking lock.

The slave cylinder volume can, for example, be calculated from a piston base area and a path interval traveled between the two piston positions. At least one of the piston positions can be adjustable over the operating time, wherein the corresponding currently adjusted piston position is used as the basis for determining the slave cylinder volume.

Using the efficiency determined, for example continuously or over the operating time of the pump, the fluid flows output from the pump can be determined independently of a leakage of the pump. In this case, a leakage which may be pressure-, temperature- or wear-related, or caused in another way, is detected by means of determining the efficiency, and the fluid flows are correspondingly corrected. The efficiency is thereby continuously adjusted to the current behavior of the pump.

The volume flow for cooling and/or lubricating drivetrain components can be set according to the rotational speed of the pump and its efficiency. The efficiency can be determined by means of a parking lock actuating slave cylinder. It is possible in principle to determine the efficiency by means of a slave cylinder of the separating clutch. Due to the system-related use of the separating clutch, for example as a slipping separating clutch during ongoing driving operation, the slave cylinder of the parking lock is however preferred. For example, the efficiency of the pump can be adjusted at each actuation of the parking lock or at longer intervals.

A hydraulic unit with a pump, at least one slave cylinder, switching valves and a control unit such as a control device with an implemented routine for carrying out the proposed method is also provided.

A drivetrain for a motor vehicle comprising this drivetrain with a drive unit, in particular an entirely electrically operated drive unit, a transmission and a separating clutch arranged between the drive unit and the transmission, and a parking lock, wherein the separating clutch and the parking lock is actuated or actuatable by means of the proposed hydraulic unit is also provided.

BRIEF DESCRIPTION OF THE DRAWINGS

The disclosure is explained in more detail with reference to the exemplary embodiment shown in FIGS. 1 to 4. In the figures.

DETAILED DESCRIPTION

Figure 1:
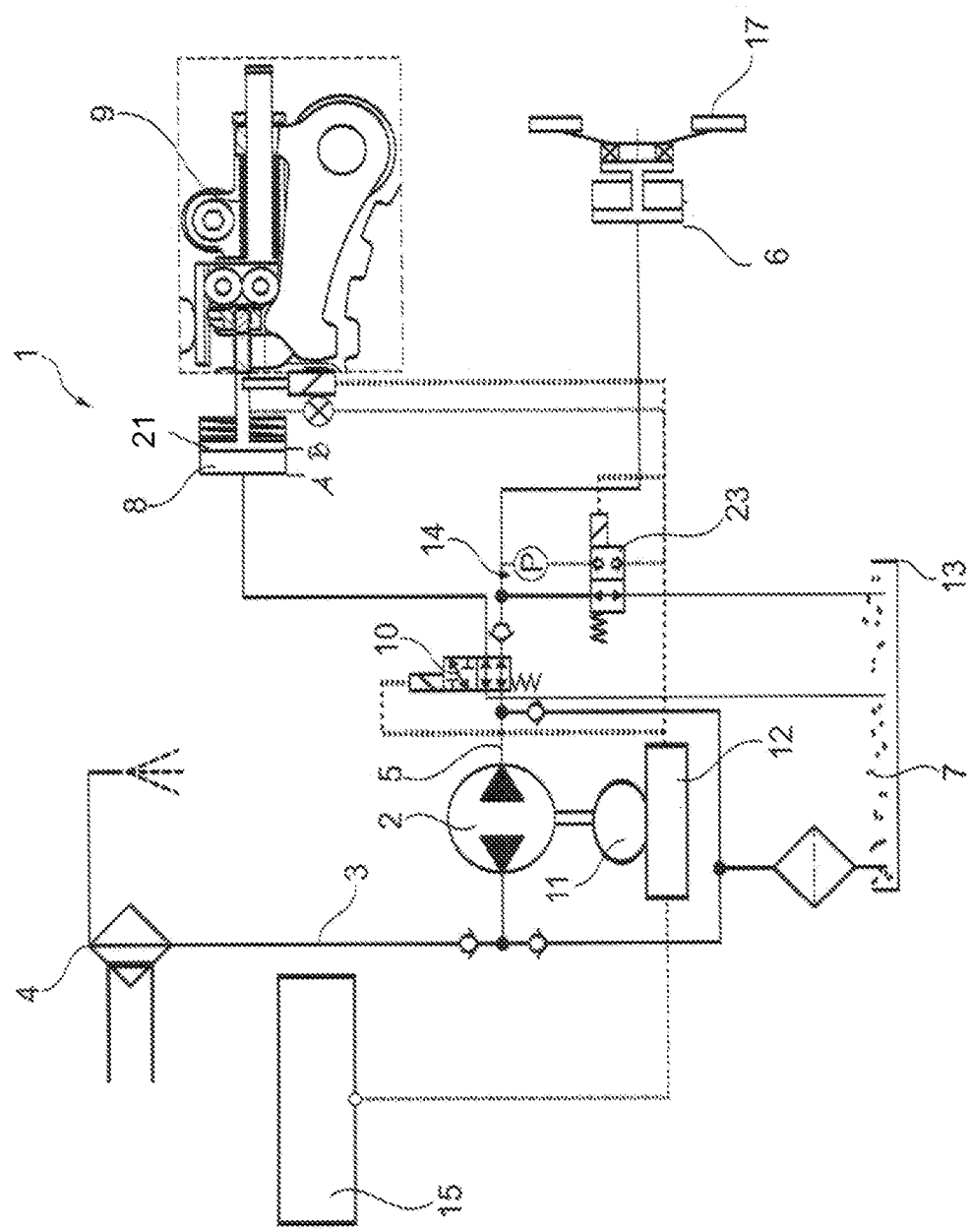
FIG. 1 shows a schematic diagram of a hydraulic unit for carrying out the method according to the disclosure.

FIG. 1 shows a schematic diagram of a hydraulic unit 1 for carrying out the method according to one example embodiment of the disclosure. The hydraulic unit 1 contains a pump 2, which is equipped, for example, as a gear pump with a leakage, which is not shown, into a fluid sump 13, which is connected on one side to the coolant line 3 in order to provide a rotary-speed-regulated volume flow. A coolant line 3 feeds a fluid 7, for example a pressure medium such as oil, to a first component 4 designed, for example, as a heat exchanger. The fluid 7 is fed to the first component 4 for the purpose of cooling or lubrication. On the other side, the pump 2 is connected to a pressure line 5. The pressure line 5 is used to pressurize slave cylinders 6, 8 of a parking lock 9 and a separating clutch 17. A switching valve 10, such as a two-way switching valve for example, is provided in order to selectively actuate the slave cylinders 6, 8.

The pump 2 is designed as an electrically driven reversible pump, in order to supply the fluid 7 to the coolant line 3 in a first direction of rotation, and to the pressure line 5 in a second direction of rotation. The pump 2 is driven by an electric motor 11 which is controlled by a control device 12. The pump 2, the electric motor 11 and the control device 12 form an electric pump actuator. A pressure sensor 14 is arranged in the pressure line 5, which is connected to the control device 12 of the pump 2 and, via this, to power electronics 15 that control the entire hydraulic unit 1.

A switching valve 23, such as a two-way switching valve for example, is used for quickly opening the separating clutch 17 and for this purpose connects the slave cylinder 6 to the fluid sump 13.

In order to determine the efficiency of the pump 2 influenced by the leakage of the pump 2, the quantity of fluid 7 output via the pressure line 5 when the switching valve 10 is switched to the slave cylinder 8 during an actuation of the slave cylinder 8 is detected as a delivered amount of the fluid 7 and compared with the slave cylinder volume of the slave cylinder 8 between the two positions A, B of a slave cylinder piston 21, for example forming their quotient. The efficiency determined in this way is used to correct the quantity of fluid 7 for the volume flow of the coolant line 3 that is set depending on the rotational speed of the pump 2.

Figure 2:
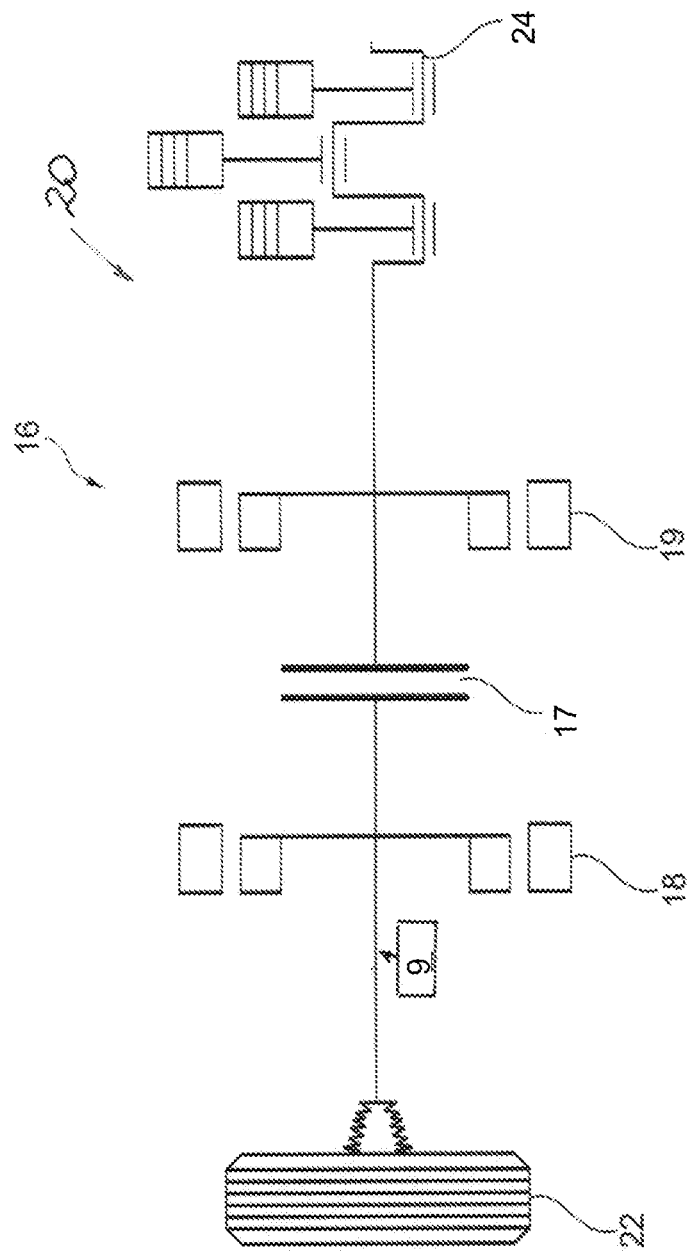
FIG. 2 shows a schematic diagram of a hybrid drive interacting with the hydraulic unit of FIG. 1.

FIG. 2 shows a schematic diagram of a drivetrain 16 designed, for example, as a hybrid drivetrain. A drive unit 20 shown in front of the separating clutch 17 contains an internal combustion engine 24 and an electric machine 19. For an entirely electric design of the drivetrain 16, the internal combustion engine 24 can be omitted. An electric machine 18 and a transmission, not illustrated, connected upstream of the electric machine 18, for example an input transmission, are provided on the opposite side of the separating clutch 17. The parking lock 9 and the separating clutch 17 are actuated by the hydraulic unit 1 of FIG. 1. The two electric machines 18, 19 can be coupled or separated by means of the separating clutch 17 and can be designed for different rotational speeds of a drive 22. On the input side of the separating clutch 17, the internal combustion engine 24 is rigidly connected to the electric machine 19, which can work as a generator and, if necessary, during entirely electric driving, can provide electrical energy for the electric machine 18 by means of the electric machine 18. The electric machine 18 is directly coupled to the drive 22 of a motor vehicle comprising the drivetrain 16.

Figure 3:
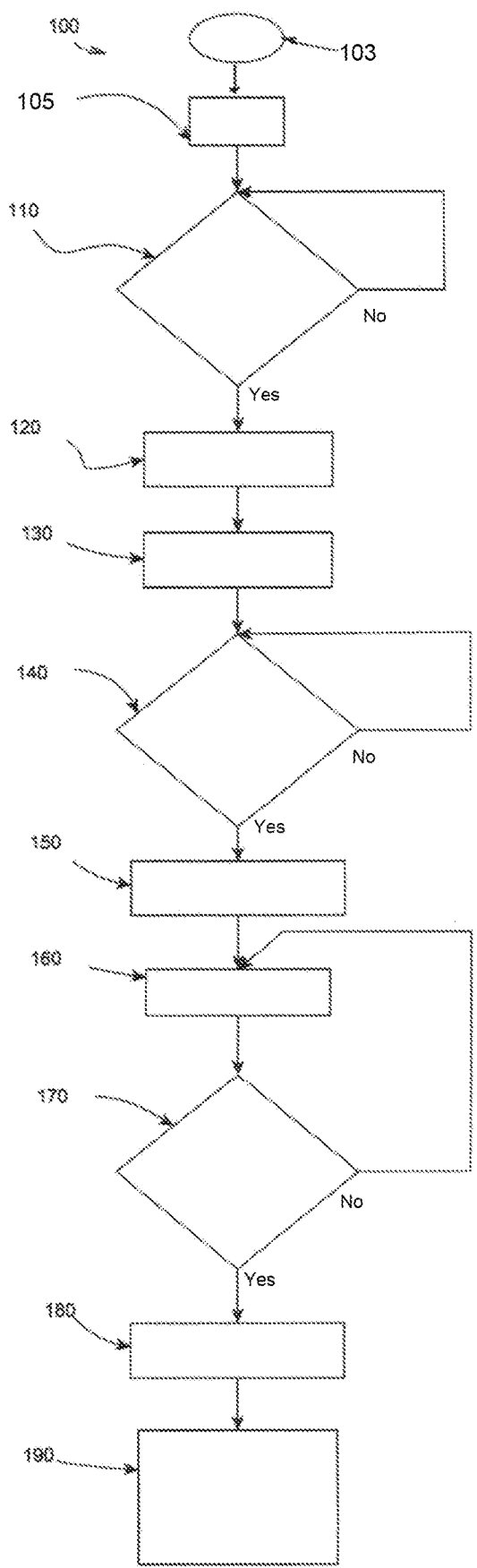
FIG. 3 shows a flow diagram of the proposed method.

FIG. 3 shows a flow diagram 100 for carrying out the proposed method for determining the efficiency of the pump 2 with reference to the hydraulic unit 1 of FIG. 1. The method is started in block 103 and initialized in block 105. The parking lock 9 with its slave cylinder 8 is switched such that the pump 2 pressurizes the fluid 7 in order to disengage the parking lock 9, so that the slave cylinder piston 21 is moved from position A into position B and thereby travels a specified path interval. The slave cylinder volume is calculated from the known piston base area of the slave cylinder piston 21 and the path interval.

In block 110, it is determined whether the parking lock 9 should be disengaged. If this is the case, in block 120, the pressure line 5 is switched to the slave cylinder 8 by means of the switching valve 10.

Then, in block 130, the rotational speed of the pump 2 is regulated at a specified value.

In block 140, there is a wait until the specified value of the rotational speed has been adjusted. If this is the case, in block 150, the position A of the slave cylinder piston 21 is detected and stored. Then, in block 160, the quantity of fluid 7, which is dependent on the rotational speed of the pump 2, is detected.

In block 170, it is checked whether a rotational speed has dropped below a target rotational speed. If this is not the case, the pump 2 continues to operate at the specified rotational speed and integrates the quantity of fluid 7. If the rotational speed drops below the specified rotational speed, for example because the slave cylinder piston 21 strikes an end position or the actuation force is too high against the action of a spring element, then, in the block 180, position B is fixed and the pump 2 switched off.

In block 190, the integrated quantity of fluid 7 is determined and divided by the slave cylinder volume calculated from the path interval between the two positions A, B and the piston base area and the mechanical efficiency of the pump 2 is determined and stored.

Figure 4:
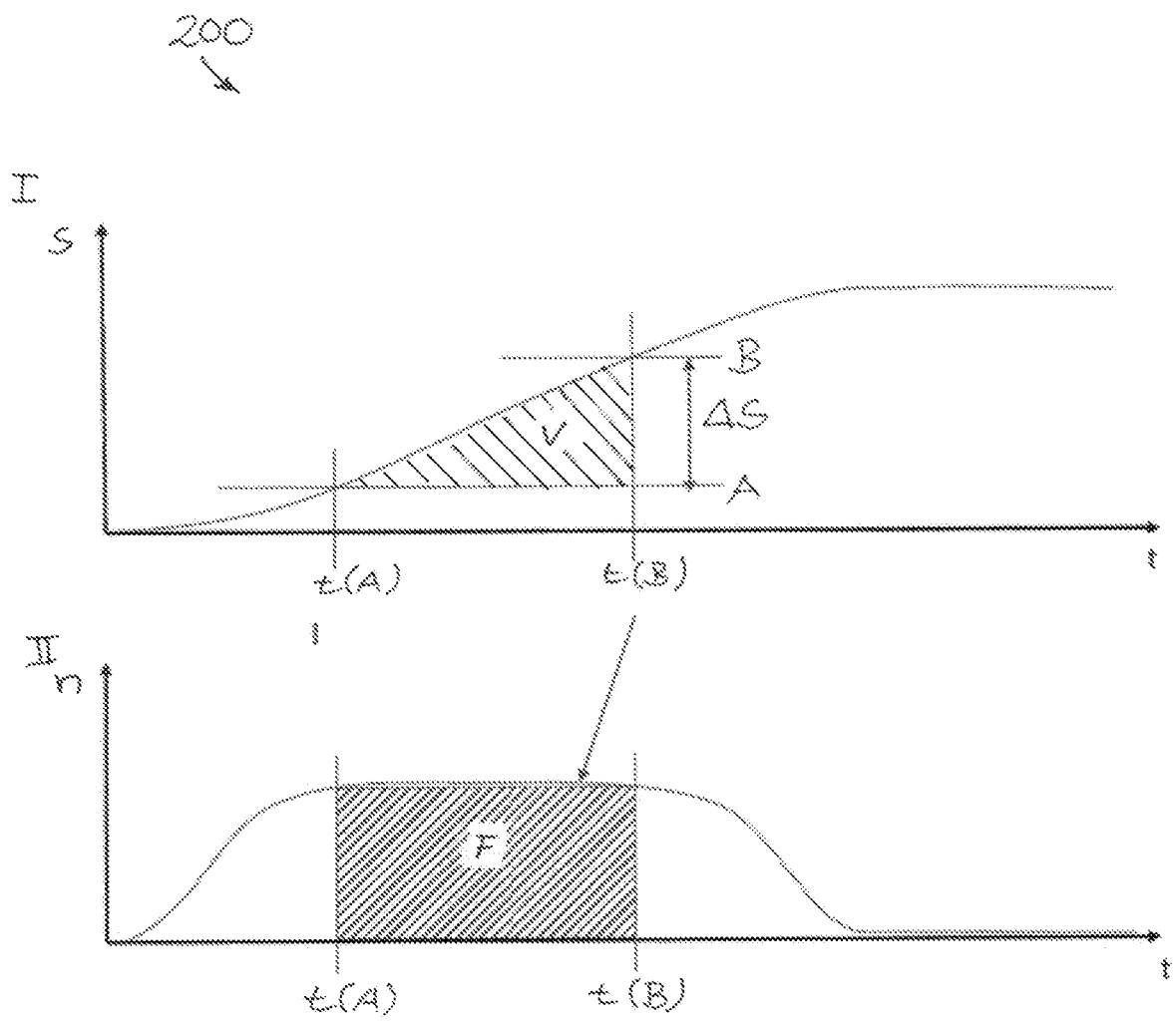
FIG. 4 shows a diagram for determining the efficiency of the pump of FIG. 1.

FIG. 4 shows, with reference to the hydraulic unit 1 of FIG. 1, the diagram 200 with the two partial diagrams I, II over the filling time t of the slave cylinder 8. Partial diagram I shows the path of the slave cylinder piston 21 over time t and partial diagram II shows the rotational speed n of the pump 2 over time t.

Between positions A, B of the slave cylinder piston 21, the slave cylinder 8 is filled at constant rotational speed n of the pump 2 and thus a linear rise of the slave cylinder piston 21. Therefore, a specified slave cylinder volume V is filled in the path interval Δs between positions A and B.

The pump 2 fills the slave cylinder 8 over the filling time t, wherein within the path interval Δs and therefore between the points in time t(A), t(B) of positions A, B, the quantity of fluid F is pumped by the pump 2 into the slave cylinder 8. Due to the leakage of the pump 2, the quantity of fluid F is smaller than the specified slave cylinder volume V and the ratio FN is the mechanical efficiency of the pump 2.

LIST OF REFERENCE SYMBOLS

1 Hydraulic unit
2 Pump
3 Coolant line
4 Component
5 Pressure line
6 Slave cylinder
7 Fluid
8 Slave cylinder
9 Parking lock 10 Switching valve
11 Electric motor
12 Control device
13 Fluid sump
14 Pressure sensor
15 Power electronics
16 Drivetrain
17 Disconnect clutch
18 Electric machine
19 Electric machine
20 Drive unit
21 Slave cylinder piston
22 Output drive
23 Switching valve
24 Internal combustion engine
100 Flow diagram
103 Block
105 Block
110 Branch
120 Block
130 Block
140 Branch
150 Block
160 Block
170 Branch
180 Block
190 Block
200 Diagram
I Partial diagram
II Partial diagram
A Position
B Position
F Quantity of fluid
V Slave cylinder volume
n Rotational speed
s Actuation path
t Filling time
t(A) Point in time
t(B) Point in time
Δs Path interval

The invention claimed is:

1. A method for controlling a hydraulic unit, comprising:
switching, via a switching valve, between at least two fluid flows at an outlet side of a rotational-speed-controlled pump, wherein one of the fluid flows actuates at least one slave cylinder and the other of the fluid flows provides a volume flow, which is controlled based on a rotational speed of the pump, and
calculating an efficiency of the pump based on a comparison of a known slave cylinder volume of the at least one slave cylinder and a quantity of fluid of the pump for the filling the at least one slave cylinder.

2. The method according to claim 1, further comprising determining the quantity of fluid by integrating the one fluid flow over a filling time of the slave cylinder volume.

3. The method according to claim 2, further comprising, during filling of the at least one slave cylinder, switching all other fluid flows of the pump off.

4. The method according to claim 2, further comprising operating the pump at a constant rotational speed during the filling time.

5. The method according to claim 2, further comprising integrating the one fluid flow along an actuation path for the at least one slave cylinder over the filling time between two positions of a slave cylinder piston.

6. The method according to claim 5, further comprising calculating the slave cylinder volume from a piston base area and a path interval traveled between the two positions.

7. The method according to claim 1, further comprising setting the volume flow according to the rotational speed and the efficiency of the pump.

8. The method according to claim 1, further comprising determining the efficiency by means of a parking lock actuating slave cylinder.

9. A hydraulic unit comprising a pump, at least one slave cylinder, a switching valve and a control device, wherein the control device is programmed to:
switch, via a switching valve, between at least to fluid flows at an outlet side of the pump,
determine a quantity of fluid of the pump for filling the at least one slave cylinder based on a fluid flow for actuating the slave cylinder; and
calculate an efficiency of the pump based on comparing a known slave cylinder volume of the at least one slave cylinder and the quantity of fluid.

10. A drivetrain, comprising a drive unit, a transmission, a separating clutch arranged between the drive unit and the transmission, a parking lock, and a hydraulic unit including a pump, at least two slave cylinders, a switching valve, and a control device, wherein one slave cylinder is engaged with the separating clutch and another slave cylinder is engaged with the parking lock, wherein the control device is programmed to:
selectively actuate the separating clutch or the parking lock via the switching valve;
determine a quantity of fluid of the pump for filling the slave cylinder engaged with the actuated one of the parking lock or separating clutch based on a fluid flow for actuating the respective slave cylinder; and
calculate an efficiency of the pump based on comparing of a known slave cylinder volume of the respective slave cylinder and the quantity of fluid.

11. The hydraulic unit according to claim 9, wherein the control device is further programmed to determine the quantity of fluid by integrating the fluid flow over a filling time of the slave cylinder volume.

12. The hydraulic unit according to claim 11, wherein the control device is further programmed to integrate the fluid flow along an actuation path for the at least one slave cylinder over a filling time between two positions of a slave cylinder piston.

13. The hydraulic unit according to claim 11, wherein the control device is further programmed to, during filling of the at least one slave cylinder, stop all other fluid flows of the pump.

14. The hydraulic unit according to claim 11, wherein the control device is further programmed to operate the pump at a constant rotational speed during the filling time.

15. The hydraulic unit according to claim 9, wherein the control device is further programmed to actuate the switching valve to provide the fluid flow for filling the at least one slave cylinder or a volume flow to a component, wherein the volume flow is based on a rotational speed of the pump.

16. The hydraulic unit according to claim 15, wherein the control device is further programmed to set the volume flow according to the rotational speed and the efficiency of the pump.

\* \* \* \* \*